MEMORY SYSTEM

Filed Aug. 20, 1953 4 Sheets-Sheet 1

INVENTORS
Jan A. Rajchman &
Richard O. Endres
BY Morris A. Rabkin
ATTORNEY

INVENTORS
Jan A. Rajchman &
Richard O. Endres
BY Morris A. Rabkin
ATTORNEY

March 5, 1957 J. A. RAJCHMAN ET AL 2,784,391

MEMORY SYSTEM

Filed Aug. 20, 1953 4 Sheets-Sheet 3

INVENTORS
Jan A. Rajchman &
Richard O. Endres
BY Morris B. Rabkin
ATTORNEY

March 5, 1957 J. A. RAJCHMAN ET AL 2,784,391

MEMORY SYSTEM

Filed Aug. 20, 1953 4 Sheets-Sheet 4

INVENTORS
Jan A. Rajchman &
Richard O. Endres
BY Morris A. Rabkin
ATTORNEY 2,784,391

MEMORY SYSTEM

Jan A. Rajchman, Princeton, and Richard O. Endres, Moorestown, N. J., assignors to Radio Corporation of America, a corporation of Delaware Application August 20, 1953, Serial No. 375,470

31 Claims. (Cl. 340—174)

This invention relates to information handling machines, and more particularly to an improvement in magnetic memories for such machines.

In an article by J. W. Forrester, in the Journal of Applied Physics for January, 1951, entitled "Digital information storage in three dimensions using magnetic cores," there is described a system for storing data in what may be referred to as magnetic core planes. These consist of a number of two dimensional arrays of magnetic cores which are placed in parallel with one another. They are then wired so that information in binary form may be stored in the arrays. Storage occurs a word at a time, a word consisting of a number of binary digits. Each digit is stored in a core in each array, and the cores wherein a word is stored are similarly positioned within their respective arrays.

Figure 5:
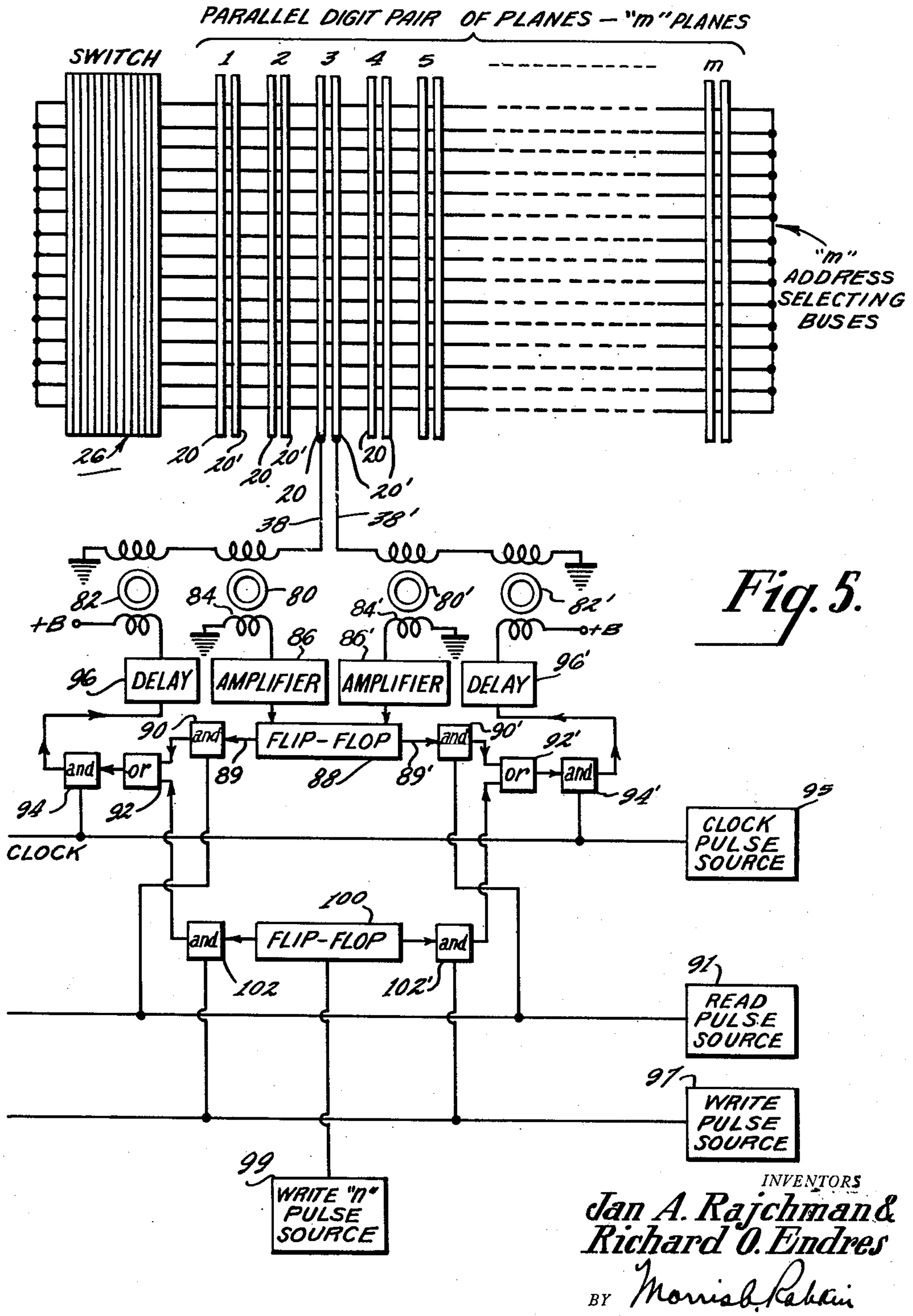

Fig. 5 of the article shows a three-dimensional storage array wherein selection of a core in each array is made by exciting one coil which passes through one core in each of the planes and by simultaneously exciting a number of second coils, each of which passes through all the cores within a single plane in which lies the selected core. A third coil or read coil is provided for each row of a plane, and these coils for a plane are coupled to all the cores in a plane and to an output circuit. These other coils serve as read out coils for reading the condition of the cores within each plane. The presence or absence of a voltage in the respective read-out coils of the planes is indicative of the condition of the cores being read.

In an application by Jan A. Rajchman, Serial No. 264,217, filed December 29, 1951, entitled "Static Magnetic Matrix Memory," and assigned to the assignee of this application, now U. S. Patent 2,734,187, there is described apparatus for driving a three-dimensional magnetic storage array with magnetic matrix switches.

A feature of this invention is to provide a simple construction for a magnetic switch for driving a three-dimensional storage array.

When a magnetic switch is used for the purpose of driving a load, it is most desirable that the load be constant. Load variations cause poor transfers of energy as well as unfavorable hysteresis effects in the switch.

Another feature of this invention is to provide a memory system whereby the load on a magnetic switch driving a three-dimensional storage array is always constant.

Still another feature of the invention is the provision of a novel memory system and apparatus for reading out of and writing information into a magnetic three-dimensional storage array.

These and other features of the invention are achieved by providing a magnetic switch which may consist of a plurality of core planes of the same type as are used in the memory. The constant load on the memory is achieved by using two cores for each memory position and insuring that the information stored in these two cores is always the opposite. In other words, one core will store P and the other N whereby any drive applied to these cores will always have the same load to overcome.

The magnetic switch for driving the three-dimensional array may be divided and the two halves are positioned on either side of the array, whereby larger cores than are used in the memory may be used conveniently in the switch.

Figure 1:
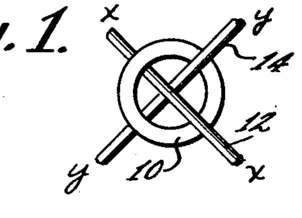

The novel features of this invention, as well as the invention itself, both as to its organization and method of operation, will best be understood from the following description, when read in connection with the accompanying drawings, in which:

Figure 1 shows, in perspective, a magnetic core of the type preferred with three windings therethrough. (This is shown to assist in an understanding of the invention.)

Figure 2:
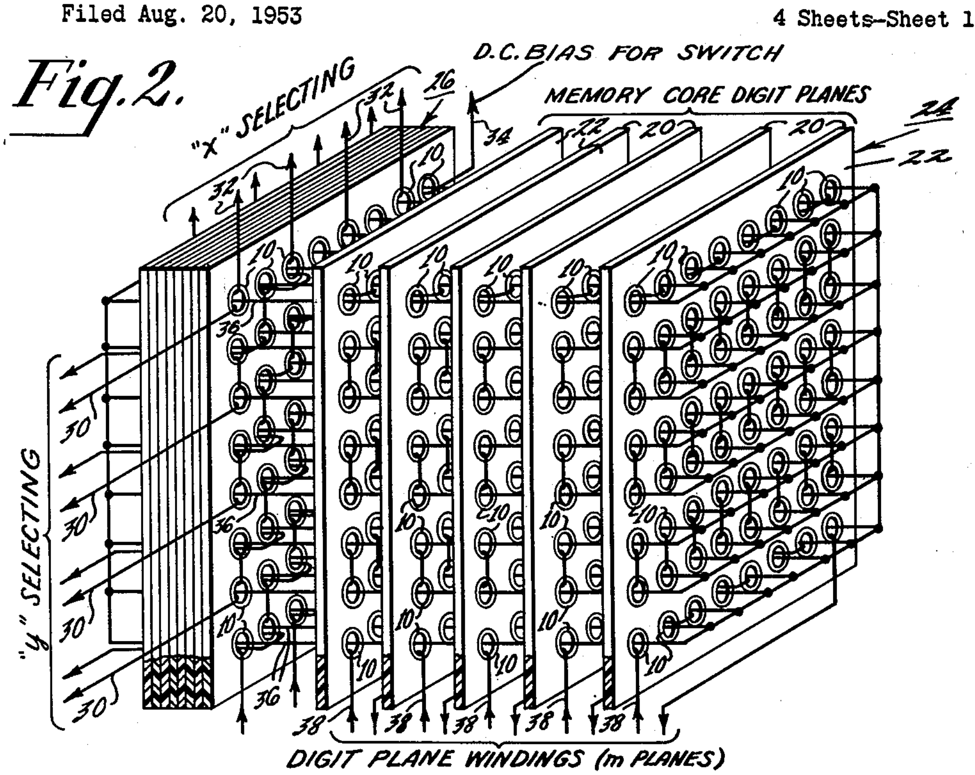
Figure 4:
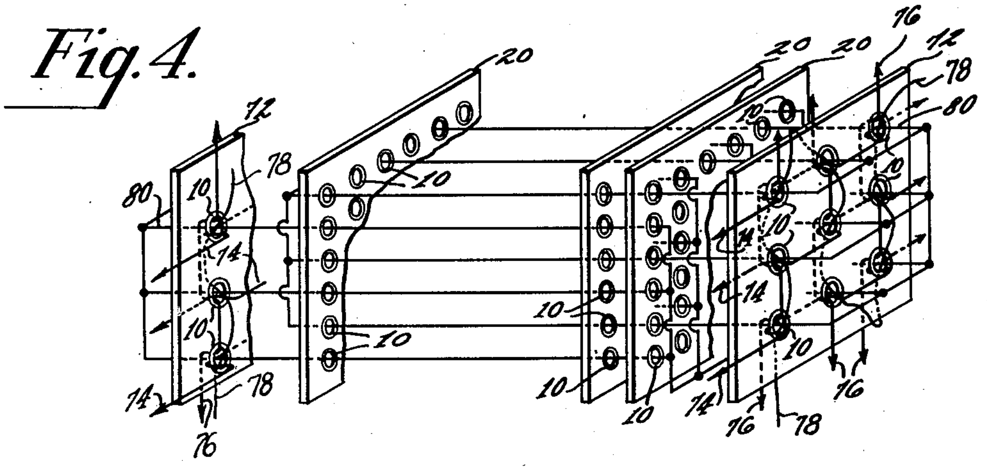
Figure 3:
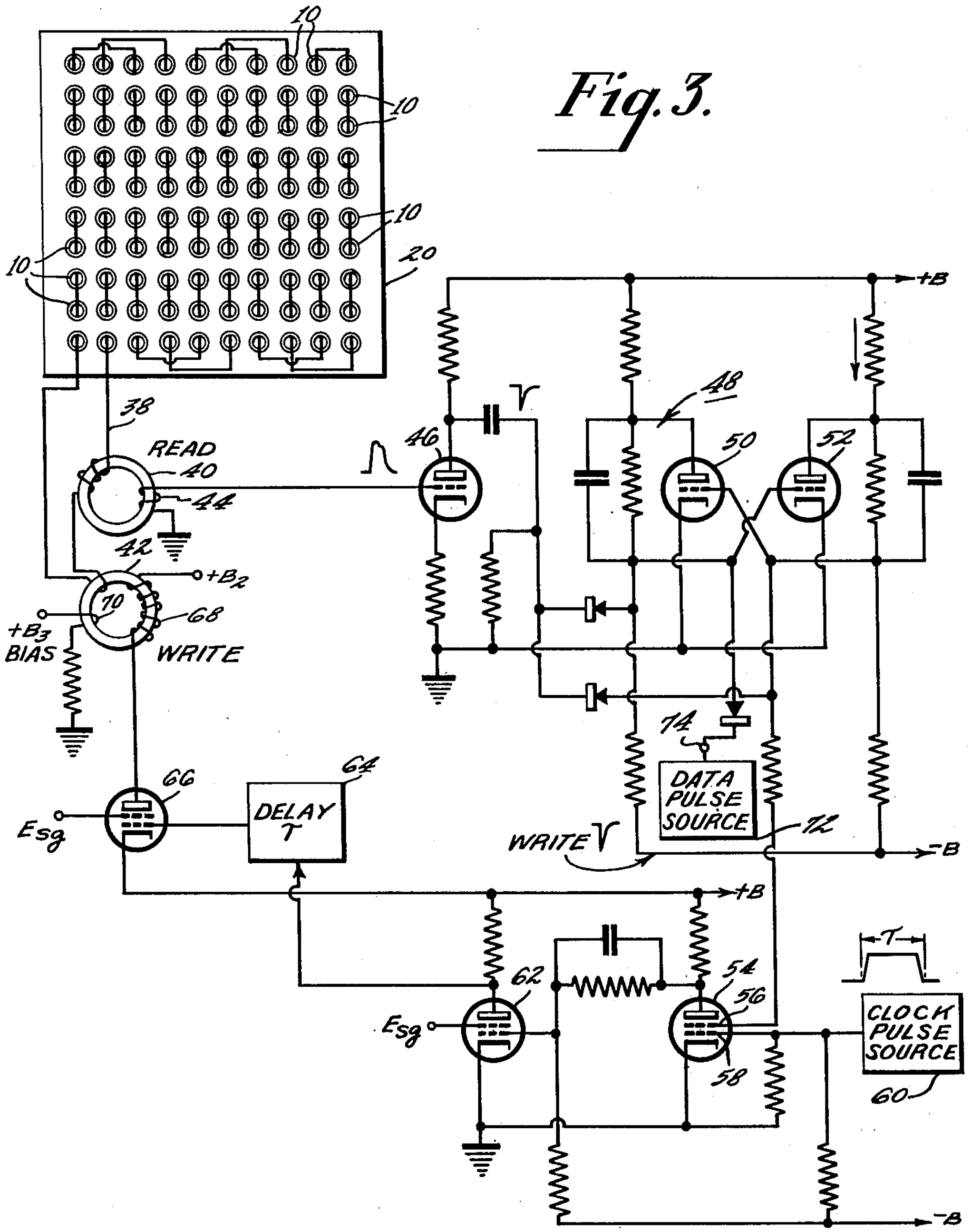
Figure 6A:
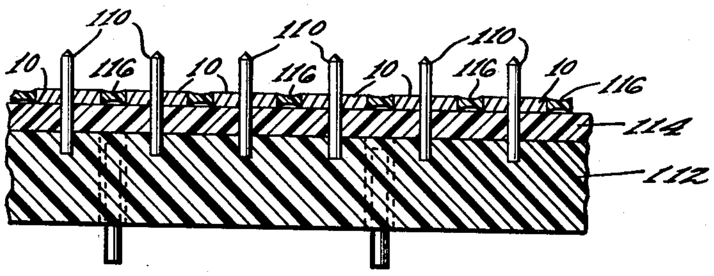
Figure 6B:
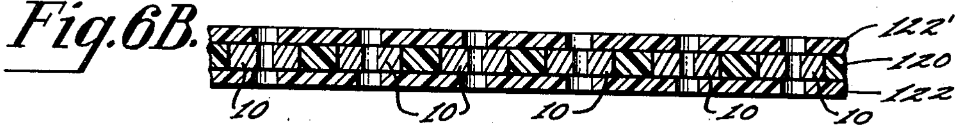
Figure 6C:
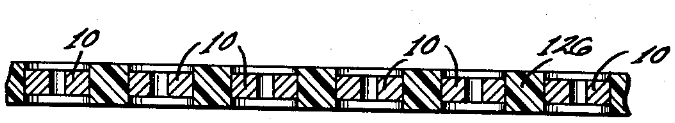
Figures 7A, 7B:
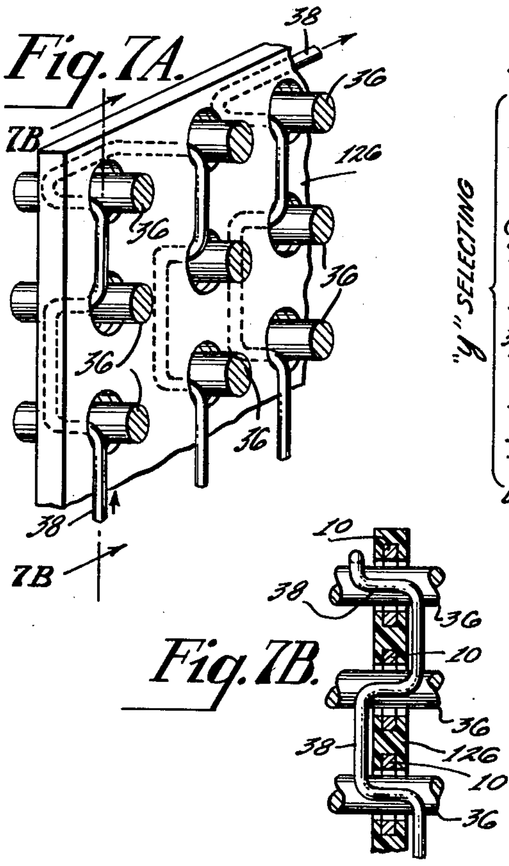
Figure 8:
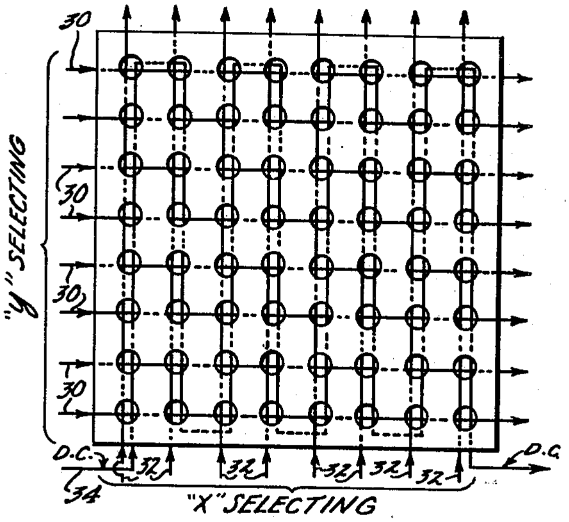

Figure 2 shows, in perspective, a magnetic memory system which is one embodiment of the present invention, Figure 3 is a circuit diagram of a read and write circuit exemplary of the kind which may be used for each core plane in a memory, Figure 4 is a drawing in perspective of another embodiment of the invention showing the memory core planes arranged to be driven by a magnetic switch on either side, Figure 5 is a schematic drawing of another embodiment of the invention showing a magnetic memory system using push-pull core planes and including a circuit to permit reading into and writing out of the memory, Figures 6A, 6B and 6C show, in cross-section, respectively core planes constructed by different methods, Figures 7A and 7B show a perspective view and a cross-sectional view of how the coils are wound on the core planes, and Figure 8 shows a plan view of how the coils are wound on the switch core planes.

Referring now to Fig. 1, there is shown a toroidal magnetic core 10 which has two windings 12, 14 passing at an angle therethrough. Thus these are coupled to the core by a single turn. One winding can be considered as an X winding and the other as a Y winding. Although the magnetic core is shown as having a toroidal shape, this is not to be considered as a restriction, since the cores may assume any desired configuration insofar as the scope of the present invention is concerned. The hysteresis characteristic for the core should preferably be substantially rectangular, as is shown and described in the previously noted article by Forrester.

If the core is saturated magnetically at one polarity, designated hereafter as N, a proper current applied through the X winding 12 which exceeds the coercive force of the core can drive it to saturation at the opposite polarity, designated hereafter as P. In being thusly driven, a voltage is induced in the Y winding 14 passing through the core. Another way to drive the core is to apply to the X winding a current which is somewhat less than the required coercive force. If, during the existence of that current, the Y winding is excited with a current which, added to the effect of the current in the X winding, produces a total magnetomotive force which exceeds the coercive force, the magnetic core can thus also be driven from saturation at one polarity to saturation at the opposite polarity. Again, if the X line is excited with a current sufficient to drive the core to saturation at P and if, simultaneously with the existence of this current, current is applied to the Y winding which provides a magnetomotive force opposite to that from the X winding and further which has an amplitude sufficient to reduce the total magnetomotive force being applied to the core below the critical value, the core will not be driven but will remain saturated at whatever polarity it had to begin with.

Let us now consider Fig. 2, which shows one manner of constructing a magnetic memory system in accordance with this invention. Consider a single core plane 20. The core plane 20 includes a large number of these toroidal cores 10 which are positioned in columns and rows within a non-magnetic retaining material 22. The cores 10 are held so that their openings are at right angles to the plane formed by the core material and the retaining non-magnetic material. A first group of these core planes are spaced apart and positioned parallel to each other and with the core openings substantially in alignment. The first group of core planes form the memory 24. A second group of these core planes are stacked like a pack of cards and may be considered as the switch portion 26 of the memory.

The switch portion of the memory preferably has selecting, output and biasing coils coupled to all the cores therein in a fashion similar to that shown in an application of Rajchman, Serial No. 337,902, filed February 20, 1953, entitled "Magnetic Switching Devices," now U. S. Patent No. 2,734,184, and assigned to the assignee of this application. The switch of Fig. 2 (similarly to the one described in the first-mentioned patent) has a plurality of magnetic cores 10 positioned in an array wherein each row of cores is coupled to a separate row coil 30; each column of cores is coupled to a separate column coil 32. Further, a winding, which is known as a biasing coil 34, is coupled to all the cores in the switch. Each core has an output coil 36. Selection of any desired core for excitation or turn-over is made by applying a current to the one row coil 30 and the one column coil 32 which intersect at, and are coupled to, the desired core. A continual D.-C. bias (not shown) is applied to the biasing coil 34 which keeps all the cores at saturation in their N magnetic condition. The excitation applied to the row coil and column coil which are selected overcomes both this D.-C. bias and the coercive force of the core selected and further provides the energy to drive a load.

When a switch core is driven from N to P it will, of course, induce a voltage in its output coil. As soon as the excitation is removed from the row and column coil, the biasing coil will operate to drive the core back to its N saturation condition. This induces a voltage of opposite polarity in the output coil 36.

For the purpose of coupling the various coils, the cores in each one of the switch core planes which are aligned may be considered as a single core even though made up of a number of cores. The advantages of this construction are that the switch core planes are identical with those of the memory, and also that the output coils for the switch may consist of straight wires which may easily be threaded through the switch cores and the memory cores and are connected in parallel through a common connection at both ends. Current which flows in one direction in an output coil coupled to a core which has just been driven returns via the common connection at the memory end of the system through all the other switch output coils, through the common connection at the switch end of the system back to the originating output core. Each core in one of the memory core planes 20 will have passing therethrough (1) the output coil from the switch, and (2) a digit plane coil (winding) 38. This is a coil which is inductively coupled to all the cores in a plane. There is one of these for each memory core plane.

In order to write a word consisting of a number of binary digits into a given memory position, the following procedure may be followed:

A switch core at the desired storage position, and thereby the memory cores aligned (in register) therewith, is addressed, as previously explained, by applying current excitation to the row coil and column coil coupled to that switch core. The addressed switch core is driven from N to P. A pulse is thereby induced in the selected switch core output coil which drives all the memory cores which are coupled to that coil to saturation at a positive, or P polarity, regardless of their previous state. The removal of the driving currents to the switch row and column coils is made at a rate which is less than the rate of their application. The biasing coil on the switch starts returning the selected switch core from P to N when the currents applied to the switch row and column coils are reduced. The rate of this reduction determines the rate of return and thus the voltage induced in the output coil since $$e=\frac{d\phi}{dt}$$

Thus, the amount of current induced in the output coil is made less than is required to drive the memory cores from P to N. Since the N restore pulse in the switch output coil is of lower amplitude than that required to switch over the memory cores, the memory cores will all remain in the state P unless additional excitation can be supplied. The additional excitation can be applied to the memory cores by means of the respective core plane windings.

Accordingly, if a negative current is applied to a core plane (digit plane) winding 38 with an amplitude sufficient to make up the deficiency in the switch output coil negative current, a core in the associated memory core plane will be driven to magnetic saturation at N. The addressed cores in the memory which do not have an excited core plane winding will, of course, remain at P. Thus, a method of writing a group of binary digits by P and N magnetic conditions is described wherein the switch first applies magnetomotive force to the aligned memory cores to drive them all to condition P, then the switch applies less than the required magnetomotive force to drive these cores toward condition N with the other portion of the latter force (to drive selected cores toward condition N) being supplied in accordance with digits sought to be stored by exciting the respective core plane coils. All the other cores in a given memory plane, which have their respective core plane coils excited, remain in whatever condition of saturation they had previous to such excitation, since the magnetomotive force provided from the core plane coil is less than the required critical value.

To read or interrogate a memory core position, a switch core at the corresponding position is addressed in the manner described for writing. In being driven to P, the corresponding switch core causes the output coil of the switch to drive all the correspondingly positioned memory cores to P. The voltages induced in the respective core plane windings as a result of this P drive are observed. A high voltage in a core plane winding means that the interrogated core in that memory plane was initially in state N and has been driven to P. A low voltage or the absence of a voltage in a core plane winding means that the interrogated core in that memory plane was initially in state P in which state it remains. Thus the number stored in the core plane position may be read.

It should be noted at this point that the system described is a current coincident system in which the selected memory core is in a plane and an intersecting line rather than at two intersecting lines in a plane, as was the case in previous systems. Furthermore, the first step of selection for reading does not involve current coincidence. Consequently the reading signal, which is obtained in each of the digit plane windings, is free of the disturbance of partially excited cores since only a selected core contributes to a reading signal and none other.

Alternative to a schedule wherein the magnetic switch provides first a P pulse and then an N pulse which is less than the critical value for the address, the schedule P and then N may be used. In that case a driven selected switch core is allowed to be restored to N at substantially the same rate as it was driven to P. However, current is applied to desired ones of the core plane windings in a direction to oppose the N drives of the switch output coil. This current is made positive and of a value, say, $$\frac{P}{2}$$

Accordingly, in the first step, as previously, all the memory cores are driven to P. In the second step a $$\frac{P}{2}$$

current is applied to the core plane coils which are coupled to those memory planes wherein it is desired to retain the memory cores in P. The other memory cores are returned to N by operation of the switch core being returned to N.

The pulses applied to the core plane coils for the purpose of writing need not have their leading and trailing edges coincident with those of the address selecting pulse from the switch. It is merely necessary that these pulses have the correct amplitude during the address selecting negative pulse. Therefore, the core plane coils may have their pulses rise and decay relatively slowly, so that the voltage induced in the relatively large inductance due to the number of memory cores coupled to the core plane coil need not be very large. As a consequence of the low speed, an economy of power in the digit writing circuits may be obtained.

Referring now to Fig. 3, there is shown a circuit diagram of a reading and writing circuit for only one memory core plane 20. One of these circuits is required for each one of the planes. One memory core plane with only the core plane coil 38 coupled thereto is shown. This coil is also coupled to two magnetic cores 40, 42, which in this instance are used as transformer cores.

One of these transformer cores 40 is a "read" core. An output coil or detecting coil 44 is also coupled to this core. This coil is also coupled to the grid of an amplifier tube 46. The amplifier output is used to drive a flip-flop circuit 48 which is a bistable trigger circuit of the well-known Eccles-Jordan type employing two tubes 50, 52 and found described in chapter 10 of the book by Reich, Theory and Applications of Electron Tubes, published by the McGraw-Hill Book Company. The output from one tube 52 of the flip-flop is applied to the suppressor grid 56 of a gating tube 54 so that when that flip-flop tube 52 is conducting, its output is low and the gating tube is held off. When the flip-flop tube 52 is not conducting, its output is high and it will accordingly permit the gating tube 54 to pass any signals applied to its control grid 58.

The gating tube output is applied to an amplifier tube 62. The output from this second amplifier tube 62 is applied through an elecrtical delay network 64 to a third amplifier tube 66. The third amplifier tube 66 has as its anode load a coil 68 which is coupled to the second or "write" transformer core 42. This core is biased to saturation at one polarity (say P) by a coil 70 to which an exciting voltage is applied. The number of turns and the current drawn through the plate load coil 68 on this core is adjusted so that when the tube conducts the core is driven from P towards N to induce a voltage in the core plane winding 38 which provides a magnetomotive force equivalent to half the desired critical value, indicated as $$\frac{N}{2}$$

The reading operation of the system occurs as follows: Switch and memory core selection, or address, occur as previously described. If the memory core being read was in P to begin with, substantially no output occurs in the core plane coil. The following output pulse from the switch is less than the required amount to drive the memory cores to N, $$\left(\text{say } \frac{N}{2}\right)$$

and the memory core accordingly remains at P. If the memory core is at N when the switch applies a P drive, then an output pulse is induced in the core plane coil 38. This pulse in turn induces a voltage in the detecting coil 44. This is amplified and applied to drive the flip-flop 48. The flip-flop output opens the gate tube 54 so that a clock pulse, from a source 60, which is timed to occur with the reading operation, can pass through the gate, be amplified and delayed until the $$\frac{N}{2}$$

output from the switch core occurs. The pulse from the delay circuit 64 then drives the second transformer core 42 to induce an aiding $$\frac{N}{2}$$

pulse in the core plane coil. Thus the memory core which was read is restored to N. When the pulse from the delay network subsides the second transformer core is returned to P by its bias. This induces a $$\frac{P}{2}$$

pulse which is detected by the detecting coil 44 and serves to reset the flip-flop circuit 48 to its initial condition, designated herein as reset.

If it is desired to write N in a memory core, regardless of its condition, a P drive is applied at the selected core position to the memory core planes via the driving switch. A pulse is also applied simultaneously therewith from a pulse source 72 to the terminal 74 connected to one grid of one of the flip-flop tubes 52 to insure that the flip-flop is in position to hold the gate tube open. The operation of the circuit to place the memory core at N is then the same as previously recited.

If the pulse scheduling from the switch is of the $P-N$ type previously described, the same circuit may be used with slight modifications. This time the circuit must deliver an inhibit pulse to those cores which were at P at the outset of the cycle and which it is desired to maintain at P. The modification required is: First, the sense of the core plane coil coupling to the second transformer core 42 is reversed so that the voltage induced in the core plane coil when the third amplifier tube 66 conducts provides a current $$\frac{P}{2}$$

Second, the flip-flop 48 is set so that it biases the gate tube open in the absence of a pulse input and biases it closed when a pulse is received. This bias is obtained by shifting the output to the gate tube 54 from the anode of tube 52 to the anode of the other tube 50 of the flip-flop. Third, the write N input terminal to the flip-flop has its connection shifted to the grid of the other tube 50 of the flip-flop. Thus, a $$\frac{P}{2}$$

inhibit pulse is delivered by the core plane coil 20 during the time an N drive is being applied from the switch to maintain the memory core at P. If the core being read was at N when the reading cycle begins, or it is desired to write N, the flip-flop circuit is triggered to close the gate tube 54. The addressed memory core is restored to N by the drive from the switch. The sense of the coupling between a switch output coil and a memory core and a core plane coil and a memory core is arranged so that storage of a digit and the reading out of that digit provides the presence or absence of a pulse in accordance with a proper and uniform representation for that digit.

The number of core planes required for a switch is determined by the losses in the system. If there were no losses in the driving system, the flux change in a switch core would be just equal to the flux change in a memory core; so that equal cross-sectional areas of switch and memory core are required in principle. Actually, however, in view of the losses, the cross-sectional area of the switch driving means should be larger than the cross-sectional area of the memory cores being driven, and accordingly the number of switch core planes is multiplied by the factor K, which is determined by the losses in the system, when it is wished to determine how many of the core planes should be employed for a switch.

Figure 4 shows, in perspective, another embodiment of the invention. This consists of having a plurality of core planes 20 for the memories as shown in Figure 2, but the switch in this case consists of a switch core plane 72 placed on either side of the memory planes. In view of the fact that this arrangement permits more room for the switch cores than was previously permitted in the embodiment shown in Fig. 2, larger switch cores 10 may be used and accordingly, instead of a stack of core planes to make up the required core areas a single core plane having large enough cores is permitted. This retains the advantages of a simple construction and a small size for the memory system.

As shown in the drawing, the switches at both ends have cores arrayed in rows and columns which, however, are also positioned to be aligned with alternate cores in the memory planes. The switches both employ the usual addressing system comprising row coils 74 and column coils 76 coupled to the respective rows and columns of cores; also, a biasing coil 78 which is coupled to all the cores in the respective switches. The output coils 80 of the two end switches are coupled to the memory cores by single turns. They are also connected in parallel at the outer sides of both switch and memory core sides so that the current return path of any single output coil consists of all the other output coils in parallel. The benefit of this type of connection is that any effects caused by air pickup from current passing in one direction through an excited output coil are cancelled by virtue of the return currents passing through the remaining output coils in the opposite direction.

The operation of the memory system of Fig. 4 is similar to that shown in Fig. 2. In this instance, however, the drive of a group of cores in the memory will come from either direction depending on the location of the switch core.

In applying a drive from a magnetic switch to a group of memory core planes, the load imposed by the core planes on the switch core will vary depending on the number of memory cores which have to be switched from N to P or from P to N on the return drive. Otherwise expressed, the amount of energy required from the switch depends upon the number of cores which are in N when the P drive is applied from the switch, and when an N drive is applied from the switch the amount of energy required is determined by the number of cores which are in P and which are to be driven to N. This varying load can lead to a very inefficient switching drive and poor switching operation. The current available for switching varies over a wide range. This can result in altered driving current waveshapes and slightly different remanent magnetizations for the memory cores due to their traversing different minor hysteresis loops. This effect may be somewhat relieved by using a series impedance, preferably a resistor, for each one of the output coils. The value selected for the impedance must be such as to make the load variations insignificant.

Reference is made to Fig. 5, which shows in a schematic form an arrangement for always maintaining the same load on the switch regardless of the number of memory cores which are in P or N. The core planes 20, 20' are shown on edge in order to simplify the illustration. The core planes for the memory are in pairs 20, 20'. The wiring for the core plane stack switch 26 may be similar to that previously described and shown in Fig. 2. The wiring for the core plane pairs 20, 20' for the memory is also the same as if there were single core planes, as in Fig. 2. In operation, however, if one of the core plane pairs 20 is considered as the first memory core plane, the other of the pairs 20' will have a core correspondingly positioned with respect to the core in the first memory core plane but saturated in the opposite polarity to the first memory core polarity. Therefore, application of a drive from the switch 24 will always have, as a load, as many P cores as there are N cores. Since the load is always the same, the operation of the switch is most efficient, the turn-over time for the cores will always be identical, and no other adverse effects result.

A circuit diagram is also shown in Fig. 5 for one of the memory core plane pairs to insure that the cores therein always have opposite polarities for each one of the core plane pairs. Each memory plane has a core plane coil 38, 38' which is coupled to serve as the primary winding of a read transformer 80, 80' and the secondary winding of a write transformer 82, 82'. The secondary windings 84, 84' of the two read transformers 80, 80' are respectively coupled through amplifiers 86, 86', which are represented by rectangles, to the control grids of two tubes which are interconnected as a flip-flop circuit 88. The flip-flop circuit 88 is represented hereby a rectangle but the circuit may be similar to the one shown in Fig. 3. Accordingly, the output from one or the other of the read transformers determines which one of the two tubes of the trigger circuit is conducting, or, expressed another way, determines which of the two trigger circuit outputs 89, 89' is high. The outputs 89, 89' from the trigger circuit are respectively coupled to two first "and" gates 90, 90'. A second input to both first "and" gates is applied from a "read" pulse source 91. Each first "and" gate output is applied to a separate "or" gate 92, 92'. Each "or" gate output is applied to a separate second "and" gate 94, 94' which has as its second input a clock pulse supplied from a clock pulse source 95. The outputs from the respective "and" gates 94, 94' are separately applied to two electrical delay lines or circuits 96, 96'. The delay line outputs are amplified by two amplifiers (which may be included in delay circuits 96, 96') and are respectively coupled to the primary windings of the two write transformers 82, 82'. The first and second "and" gates 90, 90', 94, 94' are well known as coincidence circuits requiring both inputs to be present simultaneously before an output is provided. These circuits may be of the same type as the gating tube circuit 54 shown in Figure 3. The "or" gates 90, 90' are well known as buffer circuits and provide an output whenever an input is received. Suitable "or" gate and "and" gate circuits may be found described and shown in chapter 4 of High Speed Computers, by Engineering Research Associates, published by the McGraw-Hill Book Company.

For writing, a second flip-flop 100 is provided. The two outputs of the second flip-flop 100 are respectively coupled to two third "and" gates 102, 102'. Another required input for these third "and" gates is provided from a write pulse source 97. The outputs from the two third "and" gates are respectively applied to the two "or" gates 92, 92'.

To read the condition of the cores in the memory the switch is addressed as previously described. One of the cores in a pair of planes being addressed is at N, and the other is at P. The one at N is driven to P, thereby inducing a voltage in its core plane coil. This voltage is detected in the read transformer and applied to set (place in one condition) the flip-flop 88 so that an output is applied to the first "and" gate which is associated with this core plane. Both first "and" gates 90, 90' are primed to pass an output from the trigger circuit by virtue of first having applied thereto a pulse from the read pulse source 91. However, an output is provided by only one of the "and" gates. This output is applied through the associated "or" gate to its associated second "and" gate. Arrival of a clock pulse opens the second "and" gate. The second "and" gate output is applied through the associated delay line and amplifier to the primary of the write transformer. Since the write transformer secondary is the core plane coil, the voltage arrives therein in time to provide a current to assist the switch to restore to N again the core, which was in N prior to reading. In the event that an inhibit pulse is required in the core plane coil to maintain the memory cores in P (a $P-N$ schedule for the switch instead of $$P-\frac{N}{2})$$

the read transformer outputs are coupled to the flip-flop to set it to close the first "and" gate associated with the core plane having the core in N upon receiving a pulse, instead of opening it. The first "and" gate is maintained open in the absence of a pulse and therefore its associated write transformer provides a $$\frac{P}{2}$$

inhibiting pulse to the proper core plane coil which is coupled to a core that is to be maintained at P.

The operation of the second flip-flop and the third "and" gates for the process of writing should be fairly apparent now since this structure parallels the first flip-flop and second "and" gates. For a $$\left(P-\frac{N}{2}\right)$$

switch schedule the write flip-flop 100 is set, by application of a pulse from a write N source, to open the third "and" gate on the side in which it is desired to write P. This "and" gate is primed from a write pulse source and its output is accordingly applied to its associated "or" gate. The rest of the operation is as previously described for reading. If the switch schedule is a $P-N$ one, the pulse from the write N source 99 is applied to the second flip-flop 100 to close that third "and" gate on the side on which it is desired to enter an N. The other of the cores in that pair of core planes will be left in P since the third "and" gate on this side is open, thus permitting an inhibiting pulse to be passed through to the write transformer to the proper core plane coil.

Accordingly, before reading or after writing, the cores in one plane of a pair will always be saturated at a magnetic polarity opposite to the cores in the associated plane of the pair. Besides the load on the switch being maintained uniform, the push-pull system presents another advantage in that a reading signal of either polarity is always available so that a possible ambiguity resulting from the meaning attached to the absence of a signal at a given instant is eliminated.

Figures 6A, 6B and 6C show in cross-section how a core plane may be constructed. First, a group of positioning pins 110 are driven in matrix array fashion into a base plate 112. A movable plate 114 which has perforations drilled therein so that it can be placed over the pin array is then positioned on the base plate. A core 10 is then positioned over each pin. The cores may be of magnetic ferrite or permalloy material as desired. Between the cores, plastic material 116 is flowed so that the material, upon becoming solid, holds the cores firmly in place. The movable plate may then be picked up and separated from the core plane.

Another method of construction is, as shown in Figure 6B, to provide a non-magnetic plate 120 having a thickness which slightly exceeds that of the cores. An array of holes are drilled in the plate having a diameter which slightly exceeds the outer diameter of the cores. A thin plastic plate 122 is then placed on one side of the central plate 120. The thin plate 122 has an array of holes drilled therein which are aligned with holes in the central plate, but have a diameter slightly larger than that of the hole in a magnetic core. These two plates are then glued together. The cores 10 are dropped into the holes in the thicker plate and when a second thin plate 122', which is similar to the first one, is glued to the other side of the thick plate.

Still a third arrangement is shown in Fig. 6C. A plastic or a non-magnetic plate 126 has holes drilled therein which only slightly exceed the outer diameter of the toroidal cores 10 being used. The cores are fitted into these holes and glued into position.

Figure 7A is a perspective view of a fragment of a core plane utilizing, for example, the construction of Fig. 6C. It shows in greater detail how the switch output coils 36 pass through the core openings and how the core plane coil 38 is threaded through the cores. Figure 7B is an edge view in section of the core plane, the output coils and the core plane coil, and is shown to illustrate their arrangement in greater detail. It may be desirable to provide a separate coil for read out other than the core plane coil. A reading coil (not shown) can be wound on the core plane in the same manner as the core plane coil, or in any desired checkerboard fashion to reverse the sense of the couplings to the individual cores throughout the core plane to obtain a cancellation of whatever noise voltages may arise during the process of reading.

Figure 8 is a plan view of a winding arrangement for the switch core plane. It shows how the row coils 30 are threaded through the rows of cores and the column coils 32 are threaded through the columns of cores. The biasing coil 34 is coupled to all the cores of the switch. The output coils pass through the core openings into the plane of the drawing and are not shown here, in order to simplify the drawings.

It is interesting to note, considering Figure 6A, that since one turn coupling is used the sense of the coupling of a core plane coil to the cores in a plane reverses for every core. Considering Figure 8, this sense reversal of the coupling of the row coils, column coils and biasing coil, to the cores of the switch, must be taken into consideration when threading the coils through the cores, so that the row and column coil drives, as well as the effect of the biasing coil on a switch core, are all in the proper direction. Effectively, this causes the pattern of residual polarities of the switch cores to be geometrically checkerboarded over the switch core plane. Advantage of this sense reversal is taken in driving the memory core planes, since the sense reversals occurring in the switch are matched with the sense reversals of the core plane coil so that a unidirectional output is always obtained therefrom and a unidirectional input to the coil always achieves the proper polarity to assist or inhibit the drive from a switch output coil.

The programming of the switch to drive $P-N$ or $$P-\frac{N}{2}$$

is still the same in spite of the sense reversals of the cores in the switch as indicated above. However, in one case the drive will be $N-P$ or $$N-\frac{P}{2}$$

depending on the system used and in the other case $P-N$ or $$P-\frac{N}{2}$$

The arrangements of the windings as stated above are always such as to compensate for these differences occasioned by the single turn couplings to the switch cores and the memory cores. Therefore, there should be no difference in the addressing of the memory cores via the switch. Furthermore, as indicated above, the read out from the memory storage is correct, responsive to a consistent input in accordance with the convention of ones and zeroes being respectively represented by P or N polarity, and therefore no signal deviation is required because of the sense reversals.

Of course the use of single turns for coupling to the cores is not to be considered as a limitation upon the invention. More than one turn may be used, and perforations may be made in the non-magnetic material between the cores and through the core planes so that the single turn winding may be passed through the cores in the same sense, where this is desired. This may make threading the wires a bit more difficult, but it is also a practical method of construction.

The driving switches for the memory in turn may be driven directly by tubes which use the row and column coils as plate or cathode leads or by other magnetic switches in the manner previously described, or described in detail in application Serial No. 264,217 above mentioned.

There has been described herein a novel and useful switching and memory system for storing words or a plurality of binary digits simultaneously and for reading out those words or digits with a minimum of disturbance to the reading signal. Further, a memory system has been shown for presenting a uniform load to the driving switch.

What is claimed is:

1. A magnetic memory system comprising a plurality of pairs of planes of magnetic cores, each plane including a plurality of magnetic cores arranged in columns and rows, a separate core plane coil for each plane inductively coupled to all the cores in a plane, said planes being spaced from each other and having their cores substantially in register, means to selectively drive to saturation at a desired magnetic polarity one core in every plane, said driven cores being in alignment, and means to selectively excite one of the core plane coils of each pair of planes to prevent the selected core to which said excited core plane coil is coupled from being driven and to retain it at a polarity opposite to said desired magnetic polarity.

2. A magnetic memory system as recited in claim 1 wherein said means to selectively excite one of the core plane coils of each pair of planes comprises an associated first and second transformer core for each plane of a pair, means inductively coupling each core plane coil to its associated first and second transformer core, an output winding on each first transformer core, an input winding on each second transformer core, and circuit means responsive to an output pulse in an output winding of either of the first transformer cores associated with one pair of core planes to apply a pulse to the input winding of the second transformer core associated with said first transformer core the input winding of which received said output pulse.

3. A magnetic memory system as recited in claim 2 wherein said circuit means includes a bistable trigger circuit coupled to said two output windings to provide a first output responsive to the output from one of said windings and a second output responsive to the output from the other of said windings, a first and a second "and" gate having their outputs respectively applied to each of said input windings of said second transformers, means to apply said first input to prime said first "and" gate and said second input to prime said second "and" gate, and means to apply a clock pulse to said first and second "and" gates to enable them to provide an output pulse when primed.

4. A magnetic memory system comprising a first and second plurality of core planes, each core plane including a plurality of toroidal cores made of magnetic material, non-magnetic means supporting said cores in a planar array with the axis of said cores at right angles to said plane, each of said first plurality of core planes being spaced from each other and with their core openings substantially in alignment, each of said first plurality of core planes having a separate core plane coil inductively coupled to all the cores in said plane, the core planes in said second plurality being positioned with their core openings substantially in alignment with the core openings in the cores in said first plurality of core planes, a plurality of row coils each of which is inductively coupled to all the cores in a different row of cores in said second plurality of core planes, a plurality of column coils each of which is inductively coupled to all the cores in a different column of cores in said second plurality of core planes, and a plurality of output coils a different one of each of which is inductively coupled to aligned cores in said first plurality of core planes and said second plurality of core planes.

5. A magnetic memory system as recited in claim 4 wherein the core planes in said first plurality of core planes are paired.

6. A magnetic memory system as recited in claim 4 wherein said second plurality of core planes are positioned proximal to one another, and each output coil is coupled to all those cores in said second plurality of core planes which are aligned with cores in said first plurality of core planes.

7. A magnetic memory system as recited in claim 4 wherein said second plurality of core planes includes two core planes positioned to enclose said first core planes.

8. A magnetic memory system as recited in claim 4 wherein each of said output coils includes a portion passing through the aligned openings of the cores in said planes, and all said output coils are connected in parallel at both their ends.

9. A magnetic memory system as recited in claim 4 wherein said non-magnetic means supporting said cores in a planar array comprises non-magnetic sheet material having an array of holes therein wherein said cores are positioned.

10. A magnetic memory system comprising a first plurality of core planes and a second and third core plane, each of said core planes including a plurality of toroidal cores made of magnetic material, non-magnetic means supporting said cores in a planar array with the core openings at right angles to said plane, each of said first plurality of core planes being spaced from each other and with their core openings substantially in alignment, a separate core plane coil inductively coupled to all the cores in each of said first core planes, said second and third core planes being positioned on opposite sides of said first plurality of core planes, the cores of said second and third core planes being of a different size than the cores of said first plurality of core planes, the core openings of the cores of said second core plane being substantially aligned with the openings of alternate cores of said first plurality of core planes, the core openings of said third core plane being substantially aligned with the openings of the remaining cores of said first plurality of core planes, said second and third core planes each having a plurality of row coils each of which is coupled to a different row of cores in said core planes, a plurality of column coils each of which is coupled to a different column of coils, and a plurality of output coils each of which couples a core of said second or third core plane with the cores in said first plurality of planes having their core openings aligned therewith.

11. A magnetic memory system comprising a first plurality of planes of magnetic cores, each plane including a plurality of magnetic cores arranged in columns and rows, a separate core plane coil for each plane inductively coupled to all the cores in a plane, said planes being spaced from each other and having their cores in register, a second plurality of planes of magnetic cores, the cores in said second plurality of planes being aligned with the cores in said first plurality of planes, a plurality of output coils for said second plurality of planes, each of said output coils being inductively coupled to a different core in each plane, all of which cores coupled to any one output coil are aligned with each other, means to selectively and simultaneously drive to saturation at a desired polarity one aligned core in each of said second plurality of planes of magnetic cores, and means to selectively excite said core plane coils.

12. A magnetic memory system as recited in claim 11 wherein the magnetic cores in said first and second plurality of planes of magnetic cores are all toroidal in shape and have substantially the same size, and the cores are positioned in the planes with their openings aligned with and facing the core openings in the other planes.

13. A magnetic memory system comprising a first plurality of planes of magnetic cores, each plane including a plurality of magnetic cores arranged in columns and rows, a separate core plane coil for each plane inductively coupled to all the cores in a plane, said planes being spaced from each other and having their cores in register, a second and a third plane of magnetic cores spaced on either side of said first plurality of planes, the cores in said second plane being aligned with alternate cores in said first plurality of magnetic planes, the cores in said third plane being aligned with the remaining cores of said first plurality of magnetic planes, a plurality of output coils, each of said output coils being inductively coupled to one core in every plane, all of which cores inductively coupled to any one output coil are aligned with each other, means to selectively drive a core in said second plane, means to selectively drive a core in said third plane, and means to selectively excite said core plane windings.

14. A magnetic memory system as recited in claim 13 wherein the magnetic cores in said first plurality of planes are all toroidal in shape and have substantially the same size, and wherein the cores in said second and third planes are all toroidal in shape, are of the same size and are bigger than the cores in said first plurality of planes.

15. A magnetic memory system comprising a driving switch including a first plurality of planes of cores of magnetic material positioned adjacent each other with their cores in register, a plurality of row coils each one of which is inductively coupled to all the cores in a different row, a plurality of column coils each one of which is inductively coupled to all the cores in a different column, a magnetic memory including a second plurality of planes of cores of magnetic material spaced from said magnetic switch and from each other and having their cores aligned with said switch cores, a plurality of output coils each of which inductively couples only those cores in said switch and memory planes which are aligned with each other, a plurality of core plane coils, each of said core plane coils being inductively coupled to all the cores in a different one of said memory planes, means to selectively excite one of said column coils and one of said row coils, and means to selectively excite said core plane coils.

16. A magnetic memory system comprising a plurality of planes of magnetic cores, each plane including a plurality of magnetic cores arranged in columns and rows; a separate core plane coil for each plane inductively coupled to all the cores in a plane, said planes being spaced from one another; means to selectively and simultaneously apply magnetomotive forces to a desired core in each plane, which desired cores are in register (1) to drive said desired cores towards magnetic saturation at one polarity during a first interval and (2) to partially drive said desired cores towards magnetic saturation at the opposite polarity during a second interval; means to detect during said first interval an output voltage in those digit windings which are coupled to desired cores which are initially at magnetic saturation at said opposite polarity; and means responsive to said detected output voltages to apply during said second interval excitations to those core plane coils in which the output voltages occur to restore the desired cores coupled thereto to magnetic saturation at said opposite polarity.

17. A magnetic memory system as recited in claim 16 wherein said means to drive said cores comprises a magnetic switch including a plurality of cores arranged in columns and rows, and a different output coil coupling each of said switch cores to a different group of aligned cores in said plurality of planes of magnetic cores, and said means to detect an output voltage includes, for each core plane coil, a first and a second transformer core, said core plane coil being inductively coupled to both said transformer cores, an output winding on said first transformer core, an input winding on said second transformer core, and circuit means responsive to an output in said output winding to apply a pulse to said input winding during said second interval.

18. A magnetic memory system as claimed in claim 16, said means to detect including coils a different one of which is inductively coupled to all the said cores in register with each other.

19. A magnetic memory system comprising a plurality of groups of first magnetic cores, the said cores of each group being in an array along a different surface, a magnetic switch comprising a group of magnetic switch cores in an array along a different surface, said surfaces being substantially geometrically similar and parallel, and each of said magnetic switch cores being aligned with certain of said first cores having corresponding positions on their respective surfaces, and coils, a different one of said coils coupling each said switch core to all the said cores aligned therewith.

20. A magnetic memory system comprising a plurality of groups of first magnetic cores, the said cores of each group being in an array along a different surface, a magnetic switch comprising a group of magnetic switch cores in an array along a different surface, said surfaces being substantially geometrically similar and parallel, said arrays being similar, and each of said magnetic switch bores being aligned with all those of said first cores having corresponding positions in their respective arrays, and coils each threading a different switch core and all the said first cores aligned therewith.

21. A magnetic memory system comprising a plurality of groups of first magnetic cores, the said cores of each group being in an array along a different surface, a magnetic switch comprising at least two groups of magnetic switch cores in an array along different surfaces, said surfaces being substantially geometrically similar and parallel, said first core arrays being similar to each other, and a different one of said magnetic switch cores being aligned with all those of said first cores having corresponding positions in their respective arrays, and coils, a different coil coupling all the cores in a single alignment.

22. A magnetic memory system as claimed in claim 21, said first cores being arranged between a pair of said groups of said switch cores.

23. A magnetic memory system as claimed in claim 22, each of said first cores being coupled to a core of one pair of said pair of groups, and a next adjacent one of said first cores in the same array therewith being coupled to a core of the other pair of said groups.

24. A magnetic memory system as claimed in claim 21, said first cores being arranged between a pair of said groups of said switch cores, each of said groups of cores being arrayed in rows and columns along its respective surface, each alternate one of said first cores along a row in any one group being coupled to a core of a different one of said pair, and each alternate one of said first cores along a column being coupled to a core of a different one of said pair.

25. A magnetic memory system as claimed in claim 21, said first group being arrayed next adjacent each other, and all of said switch core groups being arranged next adjacent to each other.

26. A magnetic memory system as claimed in claim 19, said surfaces being planes.

27. A magnetic memory system as claimed in claim 19, said groups of first cores being paired, with any core of any one paired group having a paired core in the other group paired with that one group, and said paired cores being coupled by one of said coils in opposite senses.

28. A magnetic memory system comprising a plurality of groups of magnetic cores, the said cores of each group being in an array along a different surface, said surfaces being substantially geometrically similar and parallel, said cores being aligned in sets of aligned cores of different ones of said surfaces, the cores of each set having corresponding positions on their respective surfaces, and switch means including coils, a different one of said coils coupling all the aligned cores of each different one of said sets and means to pass a selecting current through only a selected one of said coils at a time of an amplitude to drive to saturation all cores coupled to said selected coil.

29. A magnetic memory system comprising a plurality of groups of magnetic cores, the said cores of each group being in an array along a different surface, said surfaces being substantially geometrically similar and parallel, and each of said cores being aligned with certain others of at least one different surface having corresponding positions on their respective surfaces, thereby providing sets of aligned cores, each set comprising cores of corresponding positions on the respective surfaces, core selection means comprising a different coil through each different set of aligned cores, and means to apply a selecting current individually to any selected one only of said coils at a time.

30. The memory system claimed in claim 29, further comprising read-out coils, a different one coupled in series to all the cores on each different surface.

31. A memory system as claimed in claim 29, further comprising read-out coils, a different one of said read-out coils coupled to all the cores on each different one of said surfaces independently of any other of said read-out coils.

References Cited in the file of this patent

UNITED STATES PATENTS

| | | |
|---|---|---|
| 1,331,151 | Hopkins | Feb. 17, 1920 |
| 2,736,880 | Forrester | Feb. 28, 1956 |

OTHER REFERENCES

Publication: Electronics Magazine, April 1953, pages 146–149.